United States Patent [19]

Duchenois et al.

[11] Patent Number: 4,684,846

[45] Date of Patent: Aug. 4, 1987

[54] LUMINESCENT SCREEN HAVING RESTORED CAVITIES AND DISPLAY TUBE HAVING SUCH A SCREEN

[75] Inventors: Valère Duchenois, Paris; Michèle Fouassier, Yerres; Hugues Baudry, Varennes Jarcy, all of France

[73] Assignee: U.S. Philips Corporation, New York, N.Y.

[21] Appl. No.: 747,626

[22] Filed: Jun. 24, 1985

[30] Foreign Application Priority Data

Jul. 3, 1984 [FR] France .................. 84 10510

[51] Int. Cl.$^4$ .................. H01J 29/18; H01J 31/12; G02B 6/08
[52] U.S. Cl. .................. 313/475; 313/372; 313/526; 350/96.27
[58] Field of Search .......... 313/475, 103 R, 103 CM, 313/332–336, 372, 388, 526, 528; 350/96.20, 96.27, 96.32; 427/64, 66, 71

[56] References Cited

U.S. PATENT DOCUMENTS 4,264,408  4/1981  Benham .................. 313/475 X
4,436,366  3/1984  Abramson .................. 350/96.20

Primary Examiner—Palmer C. DeMeo
Assistant Examiner—Sandra L. O'Shea
Attorney, Agent, or Firm—John C. Fox

[57] ABSTRACT

The invention relates to luminescent screen comprising an optical fibre plate formed by the reunion of elementary optical fibres constituted by bars of core glass (10) enveloped by a cladding glass (12), the optical fibre plate being provided with cavities obtained after having hollowed out partially the core glass. The bottom of the cavities is covered by a deposit of a restoring material (30) which is transparent to the luminous flux, improving the surface state and the flatness of the bottom of the cavities and tending to minimize the break (32) at the intersection between the bottom and the wall of each cavity. The restoring material preferably has an optical index near that of the core glass in order to ensure the optical continuity. Said screen of high resolution and high luminous efficiency is used in display tubes such as night-vision tubes, X-ray converter tubes, slid scanning tubes, cathode ray tubes used in oscilloscopy or in television.

7 Claims, 5 Drawing Figures

LUMINESCENT SCREEN HAVING RESTORED CAVITIES AND DISPLAY TUBE HAVING SUCH A SCREEN

BACKGROUND OF THE INVENTION

The invention relates to an luminescent screen comprising an optical fibre plate formed by the reunion of elementary optical fibres constituted by bars of core glass surrounded by one or several cladding glasses, the optical fibre plate being provided with cavities disposed substantially perpendicularly to one of its faces, the cavities being obtained after having partially hollowed out one or several glasses, including the core glass, whilst preserving at least the cladding glass farthest remote from the core glass, the surfaces thus exposed constituting the walls of the cavities for the part substantially parallel to the axis of the elementary optical fibres, and the bottom of the cavities for the remaining part, the cavities being then filled by a luminescent product emitting a luminous flux under the influence of an electron bombardment.

It also relates to a display tube, for example an image intensifier tube used, for example in night-vision, or also a slit scanning tube, or also an X-ray converter tube, or even a cathode ray tube permitting the display of an image such as those used in oscilloscope or in television, or, generally, any tube permitting the display by means of the bombardment of a luminescent material by electrons.

A screen of this type is described in the article entitled "High Modulation Transfer Function (MTF) Phosphor Screens" by J. R. PIEDMONT and H. K. POLLEHN, published in SPIE, Vol. 99, Third European Electro-Optics Conference (1976), pp. 155-161. This screen is constituted by an optical fibre plate, each fibre being formed by a core glass surrounded by a cladding glass. In a prior art structure the luminescent material was deposited directly on the optical fibre plate and a lateral light dispersion is produced, limiting the contrast of the image and hence the performances of the system. Said authors also propose a screen comprising the above optical fibre plate, in which, however, the core glass has been removed down to a small depth in order to form the cavities. The walls of said cavities are formed by the cladding glass and the bottom is formed by the surface of the core glass previously attacked by a chemical solution which has selectively dissolved the core glass. Said cavities have a depth usually of the order of a few microns or a few tens of microns, the actual depth resulting from a compromise between the width of the cavities, the grain dimension of the luminescent material and the energy of the incident radiation. The inner walls of each cavity must be metallized in order to avoid the light emitted by a cavity from passing into the cavity of an adjacent fibre. Said cavities are then filled with a luminescent material. As for the conventional screens, an aluminium film is deposited on the grains of luminescent material, thus optically closing each cavity and electrically fixing the potential of the screen.

The screen thus formed is used in a display tube in which a flow of electrons will excite the luminescent material. Each cavity serves as a quasi-closed space and hence the light emitted in each cell can propagate only in the core glass.

Said diminution of the dispersion of the emitted light constitutes the essential advantage of the optical fibre screen. This leads to an improvement of the modulation transfer function which characterizes said dispersion. However, it appears from use that said improvement of the modulation transfer function is actually accompanied by a diminution of the light quantity restored at the other extremity of the optical fibre plate.

It is hence the object of the invention to improve the quantity of light restored at the other extremity of the optical fibre plate, while preserving the improvement of the modulation transfer function.

SUMMARY OF THE INVENTION

For that purpose the invention as described in the opening paragraph is remarkable in that the bottom of the cavities is covered by a deposit of a restoring material which is transparent to the luminous flux and which ameliorates the surface state and the flatness of the bottom of the cavities and tends to minimize the fillet at the intersection between the bottom and the wall of each cavity.

In fact, all the light emitted in each cavity does not appear at the output face of the optical fibre plate. It has appeared from observations by a scanning electron microscope that the form and the state of the surface of each cavity, after the process of chemical attack, was responsible for said loss of a quantity of light. The mechanism of chemical attack leads to a depth of attack which is much more accentuated at the boundary between the core glass and the cladding glass. The result is that the bottom of the cavities generally has a truncated shape, the depth of the peripheral fault being more important than the average depth of a cavity.

This form of cavity, taking into account the angles of incidence of the light, leads to a considerable loss of light due to a poor optical coupling between the emitting cavity and the light guide. In addition the chemical attack of the core glass produces a frosted surface state which constitutes a diffusing medium. Said phenomenon leads to a loss of supplementary light due to the fact that the rays entering the core glass are not propagated by total reflection in every elementary fibre. Moreover, the light which does not penetrate into the core glass is reflected and is partly absorbed in the emitting cavity.

It is to ensure an optimum transfer to the core glass of the luminous flux produced by the electroluminescent material, that the invention uses a restoring material which improves the surface state and the flatness of the bottom of the cavities. Said material covers the irregularities of the surface and fills the peripheral fault. It is necessary, however, to restore the form of the cavity to a substantially straight cylinder, the optimum form endeavoured. Therefore the break which appears at the intersection between the bottom and the wall of each cavity is minimized so that the surface of the bottom of the cavity is substantially equal to the surface of a cross-section of the cavity in the hollowed-out part.

In order that the light transfer be optimum, it is desirable for the restoring material to have an optical index near that of the core glass.

According to a first modified embodiment, the restoring material is an enamel, the softening temperature of which is lower than the lowest softening temperatures of the glasses constituting the optical fibre plate, in order not to damage same during the restoring process. For the manufacture of the screens according to the invention, optical fibre plates are generally used in which the glass having the lowest softening temperature is the cladding glass. Enamels having an optical index and a softening temperature in accordance with the two points already stated are those formed from the following products for molar compositions such as:

PbO: a=40 to 70%—SiO$_2$: b=5 to 30%—Al$_2$O$_3$: c=0 to 10% B$_2$O$_3$: d=10 to 35%—ZnO: e=0 to 15%—Bi$_2$O$_3$: f=0 to 3%, the products being mixed such that:

a+b+c+d+e+f=100%.

More particularly, the enamel of the composition: PbO: 60%; B$_2$O$_3$: 25%; SiO$_2$: 10%; ZnO: 4%; Al$_2$O$_3$: 1% has given satisfactory results.

According to a second embodiment, the restoring material is constituted by a mixture of aluminium phosphate and titanium phosphate, the ratios may be in the molar compositions approaching the following values:

Aluminum phosphate: 25%
Titanium phosphate: 75%.

BRIEF DESCRIPTION OF THE DRAWINGS

The invention will now be described in greater detail with reference to the accompanying drawing in which.

DESCRIPTION OF THE PREFERRED EMBODIMENT

Figure 1:
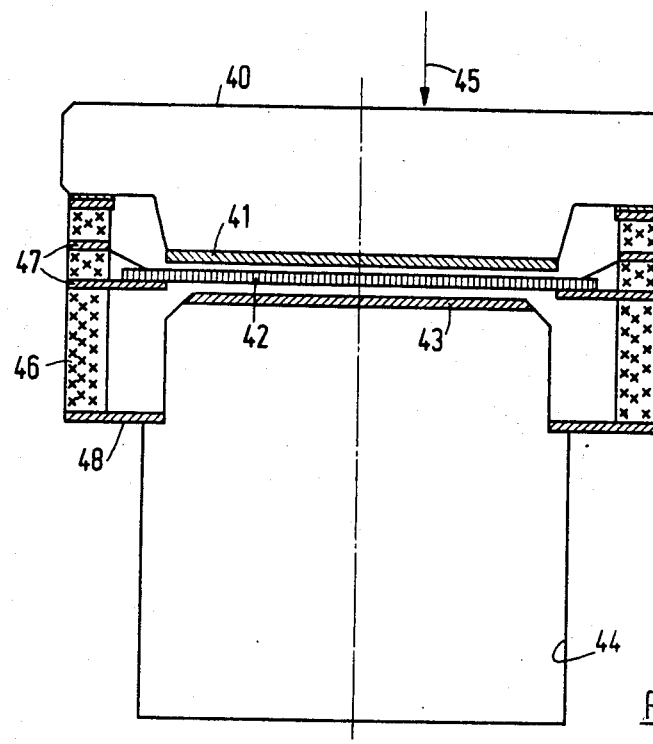
FIG. 1 is a sectional view of an image intensifier tube for night vision.

In order to define the invention, let us consider in the assembly of display tubes to which the invention relates a particular example constituted by a picture intensifier tube for night-vision such as is shown in FIG. 1. Said tube comprises an inlet window 40 traversed by the incident radiation 45. This, through the intermediary of the photocathode 41, gives rise to a flow of electrons which is intensified by the microchannel plate 42. Said densified flow of electrons will impact the screen having restored cavities 43 at the surface of the optical fibre output window 44. The input and output windows are maintained separated in a vacuum-tight manner by means of a metallic washer 48 and an insulating ring 46 of a ceramic material, through which ring means are led to apply electric potentials 47 for the microchannel plate.

Figure 2:
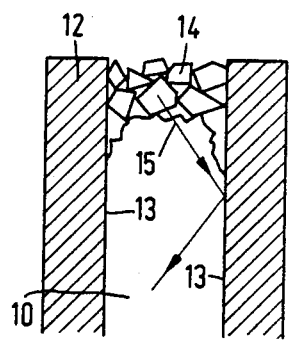
FIG. 2 is a sectional view of a prior art optical fibre element with its cavity filled with a luminescent material.

The invention relates to the screen having restored cavities 43. To describe this, let us first consider an optical fibre element according to the prior art, as shown in FIG. 2. Said element is constituted by a core glass 10, a cladding glass 12 and grains of a luminescent material 14 filling the cavity. Said material, under the action of an electron bombardment, emits light, for example the ray 15, which will traverse the optical fibre element while being confined in the core glass 10 due to the total reflection at the interface 13.

Figure 3:
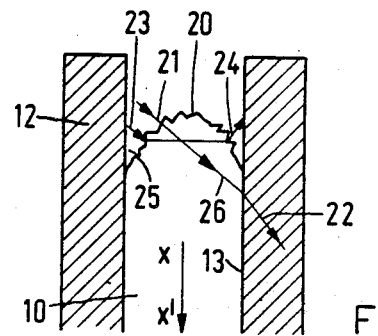
FIG. 3 is an analogous view to that of FIG. 2 wherein certain paths of lost light rays are shown.

The passage of the light from a grain of luminescent material to the core glass is shown in detail in FIG. 3 in the case of lost light rays. The surface of attack 20 at the bottom of the cavity shows considerable irregularities. It has been found that the chemical attack occurs very differently at the edge and in the centre of the bottom of the cavity. The result is that the surface of attack 20 generally presents a form resembling a truncated cone which shows a peripheral defect or break 25 all around the bottom of the cavity.

A conventional optical fibre element generally has a core glass having an average width of the aperture which may be from approximately 5 μm to 10 μm. The cavities which are hollowed out in it have a depth of the order of 2 μm to 5 μm. The peripheral defect which can be observed in each cavity generally has an average depth of 5 μm to 10 μm measured between the bottom of the defects and the central part of the bottom of the cavity.

On the other hand, the actual surface of attack presents a multitude of irregularities at the surface, producing a frost. It is these irregularities at the surface and the peripheral defects which adversely influence a good transfer of luminous flux between the grains of electroluminescent material and the core glass.

For example, considering a first incident ray 21 which meets the irregular surface of the core glass, said ray will be refracted giving rise to the refractive ray 26 which will arrive at the interface 13 at an angle such that it cannot experience total reflection but will pass into the cladding glass 12, as is shown by the first lost ray 22. After successive passages through the various fibres it will end by being absorbed by a special absorption fibre ("extramural absorbing fibre") and will hence be lost. In the same manner a second incident ray 23 incident on the peripheral defect will be refracted and then be returned towards the cavity according to the second lost ray 24. In these two cases the light rays will not be transmitted by total reflection in the core glass 10. The result is a loss of luminous flux at the output face of the optical fibre plate situated in the direction XX'.

In order to suppress the effect of said irregularities of the surface the invention uses a restoring material ensuring the optical continuity along the surface of attack 20.

Figure 4:
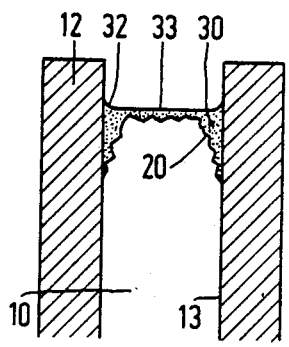
FIG. 4 is a sectional view according to the invention of an optical fibre element with the bottom of its cavity provided with a coating of a restoring material.

For that purpose, as shown in FIG. 4, the restoring material 30 is deposited on the surface of attack 20 in order to fill the peripheral defect and to suppress the effect of the irregularities of the surface. In this manner a central bottom 33 of the restored cavity is obtained where the irregularities of the surface have substantially disappeared. The peripheral defect 25 which was shown in FIG. 3 is even filled by the restoring material 30 and leaves room for a slight fillet or break 32 on the periphery of the restored cavity, the influence of said fillet being very weak on the propagation of the light.

To limit its adverse influence said fillet should be minimized and a central bottom 33 of the restored cavity which is as flat as possible should be approached by cutting substantially perpendicularly the cylinder formed by the walls of the cavity. In fact, if the fillet becomes too important (that is to say having a high radius of curvature), the light rays arriving on said zone will be at risk of reaching the interface 13 at an angle such that they are not subjected to total reflection and hence are lost.

For depositing the restoring material 30 constituted by an enamel the following method is performed. The products constituting the enamel are mixed in the required ratios. So for an enamel having an optical index of 1.9 the following molar composition is used: PbO: 60%; B$_2$O$_3$: 25%; SiO$_2$: 10%; ZnO: 4%; Al$_2$O$_3$: 1%. Its softening temperature enables the enamelling operation to be carried out at the coating temperature of 500° C. at which temperature the enamel has a sufficient fluidity to be well coated onto the surface to be treated. The mixture obtained is boiled at 1000° C. for 3 hours in a platinum crucible to form the enamel. This is then pulverized and sieved. The powder obtained is suspended in a solution of deionized water and potassium silicate filtered at 0.45 μm. Said suspension is then deposited by centrifuging in the cavities previously hollowed out in the optical fibre plate, the attack being effected according to the known method consisting of dissolving the core glass by means of pure hydrochloric acid at the temperature of 20° C. for approximately 45 minutes. The deposition of the enamel by centrifuging is carried out, for example, for 5 minutes at 2900 rpm, the excess of enamel at the surface being removed, for example, by means of a brush. In the case of the indicated composition of the enamel, the fusion of the enamel is then carried out by placing the optical fibre plate in a furnace heated at 550° C. for 30 minutes.

The screen with the restored cavities is then available for the next operation of depositing luminescent material which is effected according to the conventional known methods.

Figure 5:
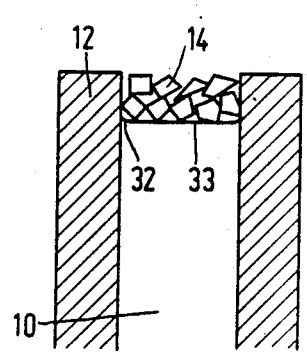
FIG. 5 is a view analogous to that of FIG. 4 with an addition of a luminescent material.

A structure of the optical fibre element having restored cavities as shown in FIG. 5 is then obtained. The surface of attack 20 is not shown, in order to stress the fact that the restoring material and the core glass have an optical continuity. The grains of the luminescent material 14 are deposited in the restored cavity. The very small fillet 32 ensures a minimum loss of light at the periphery of the cavity.

Other compositions of enamel having an optical index and a softening temperature in accordance with the invention may be used. These include enamels formed from the following products for the molar compositions such as: PbO: a=40 to 70%—$SiO_2$: b=5 to 30%—$Al_2O_3$: c=0 to 10%; $B_2O_3$: d=10 to 35%—ZnO: e=0 to 15%—$Bi_2O_3$: f=0 to 3%, each mixture having to satisfy the condition a+b+c+d+e+f=100%.

According to a second modified embodiment, a mixture of aluminium phosphate and titanium phosphate is used. The ratios may be in the molar compositions having the following values:

Aluminium phosphate: 25%
Titanium phosphate : 75%.

For preparing said mixtures and depositing them in the cavities the following method is carried out. The starting products are constituted by pure and anhydrous aluminium chloride and titanium chloride. To obtain the solution which produces aluminium phosphate, 3.3 g of anhydrous pure aluminium chloride are dissolved in 250 $cm^3$ of ethyl alcohol. After filtering, the solution is cooled at the temperature of 0° C. Next, 1.6 $cm^3$ of orthophosphoric acid are added and the mixture is cooled. A gelatinous whitish precipitate of aluminium phosphate is then progressively formed which is separated by decanting. Said precipitate is mixed with 80 $cm^3$ of methyl alcohol.

In the same manner the solution corresponding to titanium phosphate is produced. The two solutions are mixed in proportions required to obtain the endeavoured optical index, that is to say adjusted as well as possible to that of the core glass. Thus, to obtain an optical index of 1.9, 75% of the solution containing the titanium phosphate is mixed with 25% of the solution containing the aluminium phosphate. By changing the amount of methyl alcohol in the mixture, the thickness of the coating of the restoring material can be adjusted. The liquid mixture thus obtained is provided on the optical fibre plate which is then provided in an evacuated space. The air bubbles entrapped in particular in the cavities are thus evacuated and during the return to atmospheric pressure the mixture is forced to the interior of the cavities. The optical fibre plate is then dried at 200° to 250° C. where the solvent evaporates and a transparent hard product is obtained which can withstand temperatures of the order of 1000° C.

It will be obvious that other restoring materials may be used. These include materials such as varnish, plastics materials, polymers etc.

This invention has been described in particular with reference to an image intensifier tube used in nightvision. However, it may be applied to tubes which may be designed in a general manner as display tubes such as image intensifier tubes already described and used, for example, in night-vision or a slid scanning tube or an X-ray converting tube or even cathode ray tubes permitting the display of a picture such as those used in oscilloscopy or in television or in a general manner any tube permitting the display by means of bombardment of a luminophore by electrons.

What is claimed is:

1. A luminescent screen comprising an optical fibre plate formed by the reunion of elementary optical fibres constituted by bars of core glass surrounded by one or several cladding glasses, the optical fibre plate being provided with cavities disposed substantially perpendicularly to one of its faces, the cavities being obtained after having partially hollowed out one or several glasses, including the core glass, while preserving at least the cladding glass farthest remote from the core glass, the surfaces thus exposed constituting the walls of the cavities for the part substantially parallel to the axis of the elementary optical fibres, and the bottom of said cavities for the remaining part, the cavities being then filled by a luminescent product emitting a fluminous flux under the influence of an electron bombardment, characterized in that the bottom of the cavities is covered by a deposit of a restoring material which is transparent to the luminous flux to improve the surface state and the flatness of the bottom of the cavities, and tending to minimize the break at the intersection between the bottom and the wall of each cavity, thereby to improve the luminous flux between the luminescent product and the core glass.

2. A luminescent screen as claimed in claim 1, characterized in that the restoring material has an optical index close to that of the core glass.

3. A luminescent screen as claimed in claims 1, characterized in that the restoring material is an enamel having a softening and coating temperature lower than the lowest softening temperature of the glasses.

4. A luminescent screen as claimed in claim 3, characterized in that the restoring material is an enamel of which the composition is chosen, as a function of the optical index and desired softening and coating temperatures in the range of the following molar compositions:

PbO: a=40 to 70%—$SiO_2$: b=5 to 30%—$Al_2O_3$: c=0 to 10%—$B_2O_3$: d=10 to 35%—ZnO: e=0 to 15%—$Bi_2O_3$: f=0 to 3%, in such a manner that a+b+c+d+e+f=100%

5. An luminescent screen as claimed in claim 4, characterized in that the restoring material is an enamel which has the following molar composition: PbO: 60%; B$_2$O$_3$: 25%; SiO$_2$: 10%; ZnO: 4%; Al$_2$O$_3$: 1%.

6. A luminescent screen as claimed in claim 1, characterized in that the restoring material is a mixture of aluminum phosphate and titanium phosphate.

7. A display tube characterized in that it comprises a luminescent screen as claimed in any of the claims 1 to 6.

* * * * *